United States Patent
Fex, Jr.

(10) Patent No.: US 6,584,855 B1
(45) Date of Patent: Jul. 1, 2003

(54) METHOD OF SENSING PRESSURE OUTSIDE OF A BUILDING

(76) Inventor: J. Patrick Fex, Jr., 1521 Via De Luna, Pensacola, FL (US) 32561

( * ) Notice: Subject to any disclaimer, the term of this patent is extended or adjusted under 35 U.S.C. 154(b) by 0 days.

(21) Appl. No.: 09/592,457

(22) Filed: Jun. 9, 2000

(51) Int. Cl.$^7$ .................. G01L 7/00; G01L 19/08
(52) U.S. Cl. .................. 73/756; 73/700; 73/712
(58) Field of Search .................. 73/756, 700, 712; 348/564; 340/593

(56) References Cited

U.S. PATENT DOCUMENTS 3,685,355 A * 8/1972 DeBaun .................. 73/212
4,706,882 A * 11/1987 Barnard .................. 236/46 R
6,031,579 A * 2/2000 Stephenson .................. 340/539
6,101,436 A * 8/2000 Fortune et al. .................. 177/144
6,134,970 A * 10/2000 Kumakawa et al. .................. 600/595

FOREIGN PATENT DOCUMENTS

JP   409196959 A  *  7/1997  .......... G01P/13/00
JP   09203681 A   *  8/1997  .......... G01L/19/06

* cited by examiner

Primary Examiner—Edward Lefkowitz
Assistant Examiner—Lilybett Martir
(74) Attorney, Agent, or Firm—J. Nevin Shaffer, Jr.

(57) ABSTRACT

A method for obtaining the average ambient air pressure outside of a building places a pressure sensor on each major outside wall of the building or around the outer circumference of a one sided (e.g., round) building. The pressure reading from each pressure sensor is obtained and the pressure readings are added together to obtain a total reading. The total reading is divided by the number of pressure readings making up the total, the result being the approximate average ambient air pressure outside of the building.

14 Claims, 2 Drawing Sheets

METHOD OF SENSING PRESSURE OUTSIDE OF A BUILDING

BACKGROUND OF THE INVENTION

1. Field of the Invention

The present invention relates to a method to obtain the approximate average ambient air pressure outside of a building.

2. Background of the Prior Art

One of the tasks of a building's maintenance personnel is to properly control the internal air pressure within the building. Ideally, the internal air pressure should be slightly above the external air pressure so as to allow the opening of external doors, which swing outwardly, without undue exertion. In industrial application, accurate positive building pressure is critical for explosion, corrosion and moisture control.

Typically, a pressure sensor is positioned on an external wall of the building, with the pressure sensor giving a reading of the external air pressure, allowing the building personal or building automatic control systems to take appropriate actions. The problem with this method of measuring outside air pressure is the skewing of the pressure reading caused by the wind. If a wind is blowing against the building and the pressure sensor is on the windward side of the building, the pressure reading will be higher than the actual ambient air pressure, whereas if the pressure sensor is on another wall, the pressure reading will be lower than the actual ambient air pressure. Accordingly, the wind will skew the pressure either higher or lower than the actual ambient air pressure depending on the direction of the wind and the location of the pressure sensor.

Therefore, there is a need in the art for a method to obtain the ambient air pressure outside the building that overcomes the above-stated problems. Such a method must be able to account for the effects of wind on a pressure reading and must arrive at an air pressure reading that is relatively accurate. Such a method must be relatively simple to implement and execute.

SUMMARY OF THE INVENTION

The method for sensing pressure outside of a building of the present invention addresses the aforementioned needs in the art. The method delivers a relatively accurate ambient air pressure outside of a building taking into account the effects of wind on individual pressure sensors. The method is relatively simple to implement and execute.

The method for sensing pressure outside of a building of the present invention comprises the steps of attaching a first pressure sensor to each of the outer walls of the building or around the circumference of a building that has at least one generally arcuate side, each first pressure sensor capable of giving a pressure reading. The pressure reading from each of the first pressure sensors is collected and the pressure readings are added together to obtain a total reading. The total reading is divided by the number of pressure readings making up the total reading giving an average ambient air pressure. The pressure sensors are disposed on a first plane, the first plane being generally horizontally disposed. A set of second pressure sensors can be attached to each of the outer walls of the building (or about the outer circumference of a building having at least one generally arcuate side, each second pressure sensor capable of giving a second pressure reading. The pressure reading from each of the second pressure sensors is collected and these pressure readings are added together to obtain a second total reading. The second total reading is divided by the number of pressure readings making up the second total reading giving an average ambient air pressure for that set of second pressure sensors. The second pressure sensors are disposed on a second plane which is in spaced apart and generally parallel relation to the first plane.

BRIEF DESCRIPTION OF THE DRAWINGS

Similar reference numerals refer to similar parts throughout the several views of the drawings.

DESCRIPTION OF THE PREFERRED EMBODIMENT

Figure 1:
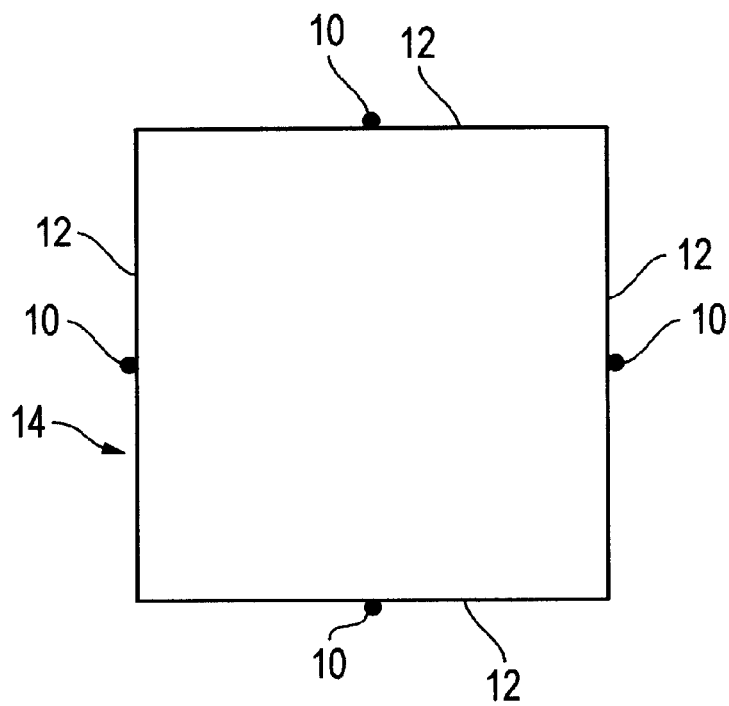
FIG. 1 is a top plan view of pressure sensor placement about a generally symmetrical building.
Figure 2:
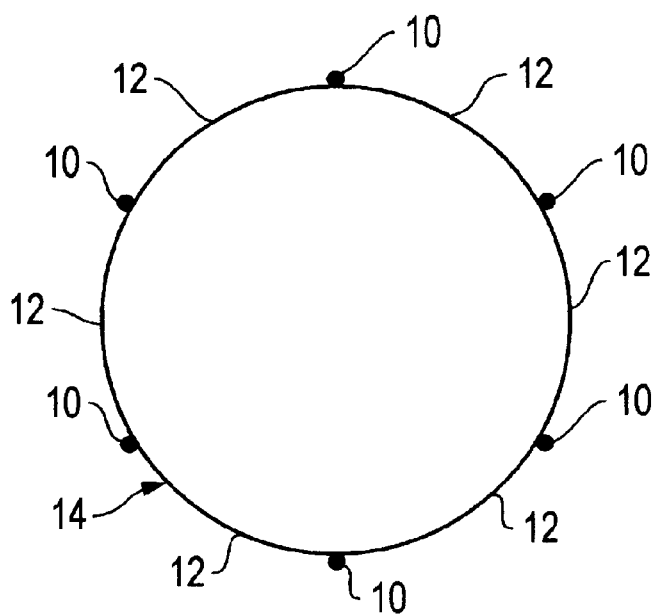
FIG. 2 is a top plan view of pressure sensor placement about a building having at least one arcuate side.
Figure 3:
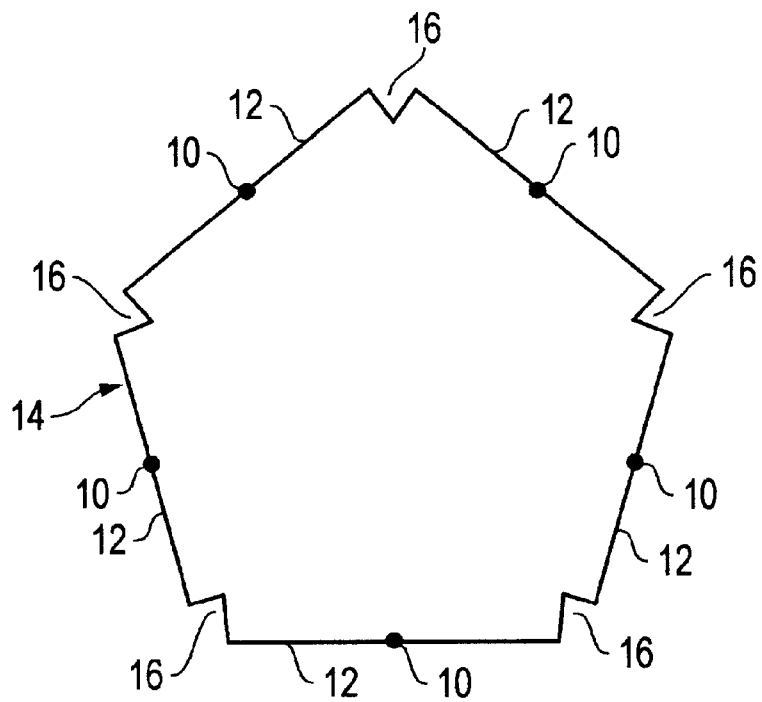
FIG. 3 is a top plan view of pressure sensor placement about a building having an arbitrary shape.

Referring now to the drawings, it is seen that the method of sensing pressure outside of a building of the present invention uses at least one pressure sensor 10 that is placed on each outside wall 12 of a building 14. If the building 14 is generally symmetrical, such as the square building 14 illustrated in FIG. 1, placement of the pressure sensors 10 about the building 14 should also be generally symmetrical. If the building 14 is generally round or otherwise has one or more arcuate outside walls, as illustrated in FIG. 2, the pressure sensors 10 should be placed about the building 14 in spaced apart relation and with a generally uniform distance between each adjacent pressure sensor 10. If the building 14 has an arbitrary shape, as illustrated in FIG. 3, the pressure sensors 10 should be placed on each major outside wall 12 in generally uniform spacing (e.g., if a pressure sensor 10 is located at the midpoint of one outside wall 12, then the pressure sensor 10 on each outside wall 12 should be at the midpoint, if two pressure sensors 10 are placed on each outside wall 12 and one of the pressure sensors 10 is 40 percent distant from the start of the outside wall 12 and the second pressure sensor is 65 percent distant from the start of the outside wall 12, then this 40 percent, 65 percent arrangement should be utilized on all outside walls 12 with the start of each outside wall 12 being consistent in proceeding around the building 14 in clockwise fashion. In all cases, placement of a pressure sensor 10 close to a meeting point of two outside walls 12 should be avoided due to potentially anomalous readings that can be obtained at such corners. Additionally, placement of pressure sensors 10 onto the walls within an alcove 16 should also be avoided due to the potentially anomalous readings that can be obtained within the alcove 16.

Figure 4:
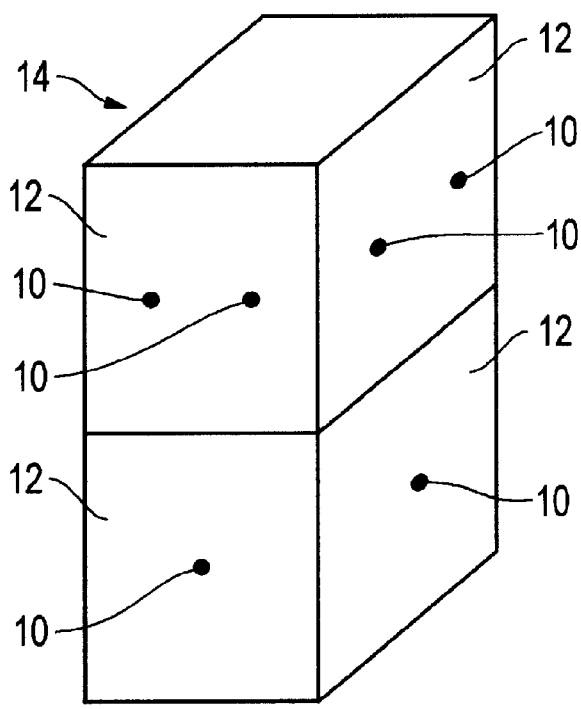
FIG. 4 is an elevation view of a building illustrating multiple pressure sensor set placement.

Additional sets of pressure sensors 10 can be placed at different heights of the building 14, such as one set of pressure sensors 10 per floor of the building 14, as illustrated in FIG. 4. Placement of each set of pressure sensors 10 on each floor of the building should follow the placement rules stated above, however, it is not necessary that the arrangement of a set of pressure sensors 10 on a given floor match the arrangement of another set of pressure sensors 10 on any other floor—the arrangement on a given floor may be independent of any other floor.

In operation, the pressure reading is obtained from each pressure sensor 10 within a given set of pressure sensors 10. The multiple pressure readings are added together to obtain a total reading, and this total reading is divided by the number of pressure readings making up the total reading. The result is a close approximation of the average ambient pressure present about the building 14. This process is repeated for each set of pressure sensors 10 that are placed on the outside wall/skin 12 of building 14 so that an average ambient(surrounding) pressure is obtained for each height (floor, etc.) of the building. As such, it is clear that pressure sensors 10 dynamically measure the effect of wind pressure causing air to enter and leave through the skin 12 of building 14. From the results obtained, the internal pressure within the building 14 can be adjusted as desired, through appropriate existing techniques, either per floor or in aggregate for the entire building.

As used herein the outside (outer) wall 12 obviously includes what is known as the "skin" of a building, glass, brick, etc., in addition to the structural support for the building 14. Further, as set forth herein, the term "sensor" is used as is commonly understood. That is, as used herein, the term "sensor" includes any device that responds to a physical stimulus. Pressure sensors 10 have the ability to receive and react to stimuli as true sensors do. This attribute of pressure sensors 10 is necessary so that the pressure measurements/readings may be obtained as required herein. As such, pressure sensors 10 are "dynamic" in that they determine the pressure exerted by a moving body of air as it passes through the skin 12 of the building 14. Further, pressure sensors 10 respond to this dynamic stimuli and provide readings in response to the stimuli.

This method of sensing pressure outside of a building relies on the fact that the velocity pressure created by the wind on one portion of the building will have an offsetting effect on another portion of the building. For example, a wind hitting directly on the top outside wall 12 of the building in FIG. 1 will produce a low wind velocity but a high air pressure at that wall as well as at the bottom wall opposite the top wall. The remaining two walls will have a high wind velocity and a resulting low air pressure allowing the approximate average ambient air pressure to be averaged out from the various pressure sensors 10. If the wind hits the same building at the upper right hand corner of the building 14, the top wall of the building 14 and the right side wall of the building 14 will have a high wind velocity and a resulting low air pressure and the bottom wall and the left side wall will having a low wind velocity and a high air pressure again allowing the approximate average ambient air pressure to be averaged out from the various pressure sensors 10. It is noted that the terms top wall, bottom wall, left wall, and right wall are for convenience only with respect to the drawings and are not meant to be a limitation on the method of the present invention.

While the invention has been particularly shown and described with reference to an embodiment thereof, it will be appreciated by those skilled in the art that various changes in form and detail may be made without departing from the spirit and scope of the invention.

I claim:

1. A method for sensing pressure at the outside skin of a building, the building having a plurality of outer walls, the method comprising the steps of:

attaching a first dynamic pressure sensor to each of the plurality of outer walls, each first dynamic pressure sensor capable of giving a first dynamic pressure reading;

collecting the first dynamic pressure reading from each of the first dynamic pressure sensors;

adding each of the first dynamic pressure readings together to obtain a first total; and dividing the first total by the number of first dynamic pressure readings.

2. The method as in claim 1 wherein each of the first dynamic pressure sensors is generally arranged in a parallel line, the parallel line being generally horizontally disposed.

3. The method as in claim 1 further comprising the steps of:

attaching a second dynamic pressure sensor to each of the plurality of outer walls, each second dynamic pressure sensor capable of giving a second dynamic pressure reading;

collecting the second dynamic pressure reading from each of the second dynamic pressure sensors;

adding each of the second dynamic pressure readings together to obtain a second total; and dividing the second total by the number of second dynamic pressure readings.

4. The method as in claim 3 wherein each of the first dynamic pressure sensors is grouped and arranged in a parallel line and wherein each of the second dynamic pressure sensors is grouped and arranged in a second parallel line, the second parallel line being spaced apart from, and generally parallel in relation to, the first parallel line and the first parallel line and the second parallel line being generally horizontally disposed.

5. The method of claim 1 wherein said outer skin of said building covers at least one floor.

6. The method of claim 1 wherein said outer skin of said building covers a plurality of floors and said first dynamic pressure sensors are attached to the outer skin of the building on each of said plurality of floors.

7. The method of claim 1 wherein said outer skin of said building covers at least three floors and said first dynamic pressure sensors are attached to the outer skin of the building on each of said at least three floors.

8. A method for sensing pressure at the outside skin of a building, the building having a plurality of outer walls, the method comprising the steps of;

attaching a plurality of first dynamic pressure senors to each of the plurality of outer walls in spaced apart relation, each of the plurality of first dynamic pressure sensors capable of giving a first dynamic pressure reading;

collecting the first dynamic pressure reading from each of the plurality of first dynamic pressure sensors;

adding each of the first dynamic pressure readings together to obtain a first total; and dividing the first total by the number of first dynamic pressure readings.

9. The method as in claim 8 wherein each of the plurality of first dynamic pressure sensors is generally arranged in a parallel line, the parallel line being generally horizontally disposed.

10. The method as in claim 8 further comprising the steps of:

attaching a plurality of second dynamic pressure sensors to each of the plurality of outer walls, each of the plurality of second dynamic pressure sensors capable of giving a second dynamic pressure reading;

collecting the second dynamic pressure reading from each of the plurality of second dynamic pressure sensors;

adding each of the second dynamic pressure readings together to obtain a second total; and dividing the second total by the number of second dynamic pressure readings.

11. The method as in claim 10 wherein each of the plurality of first dynamic pressure sensors is grouped and arranged in a first parallel line and wherein each of the plurality of second dynamic pressure sensors is grouped and arranged in a second parallel line, the second parallel line being spaced apart from, and generally parallel in relation to, the first parallel line and the first parallel line and the second parallel line being generally horizontally disposed.

12. The method of claim 8 wherein said outer skin of said building covers at least one floor.

13. The method of claim 8 wherein said outer skin of said building covers a plurality of floors and said plurality of first dynamic pressure sensors are attached to the outer skin of the building on each of said plurality of floors.

14. The method of claim 8 wherein said outer skin of said building covers at least three floors and said plurality of first dynamic pressure sensors are attached to the outer skin of the building on each of said at least three floors.

* * * * *